(12) United States Patent
Pearlman et al.

(10) Patent No.: US 6,686,563 B1
(45) Date of Patent: Feb. 3, 2004

(54) COMBINATION FOOD PREPARATION AND SELF-SERVE DELIVERY SYSTEM

(75) Inventors: Wade Pearlman, Oakhurst, NJ (US); Richard L. Poland, Cranford, NJ (US)

(73) Assignee: Creative Serving Incorporated, Union, NJ (US)

( * ) Notice: Subject to any disclaimer, the term of this patent is extended or adjusted under 35 U.S.C. 154(b) by 0 days.

(21) Appl. No.: 10/209,813

(22) Filed: Aug. 1, 2002

(51) Int. Cl.[7] .......................... A47J 39/02; A23L 1/025
(52) U.S. Cl. .................. 219/385; 219/214; 219/396
(58) Field of Search ...................... 219/385, 214, 219/393, 395–398; 312/236

(56) References Cited

U.S. PATENT DOCUMENTS

| | | | |
|---|---|---|---|
| 1,682,827 A | | 9/1928 | Brand |
| 2,229,911 A | * | 1/1941 | Anderson .................... 312/131 |
| 3,632,968 A | * | 1/1972 | Wilson ........................ 219/214 |
| 3,911,248 A | * | 10/1975 | Buday et al. ................ 219/214 |
| 4,093,041 A | | 6/1978 | Davis et al. |
| 4,208,972 A | | 6/1980 | Arend et al. |
| 4,274,551 A | * | 6/1981 | Hicks .......................... 221/78 |
| 4,285,391 A | | 8/1981 | Bourner |
| D264,031 S | | 4/1982 | Sorensen |
| 4,343,985 A | | 8/1982 | Wilson et al. |
| 4,476,848 A | | 10/1984 | Protas |
| 5,203,255 A | | 4/1993 | Wells et al. |
| D352,192 S | | 11/1994 | Gelinas |
| 5,464,279 A | | 11/1995 | Wells et al. |
| 5,553,934 A | | 9/1996 | Wells et al. |
| 5,626,028 A | | 5/1997 | Graat et al. |
| 5,771,789 A | | 6/1998 | Davis |
| D398,461 S | | 9/1998 | Baluk et al. |
| D398,462 S | | 9/1998 | Baluk et al. |
| 5,939,125 A | * | 8/1999 | Tippmann et al. .......... 426/523 |
| 5,979,604 A | | 11/1999 | Pinna et al. |
| 6,034,355 A | | 3/2000 | Naderi et al. |
| 6,102,162 A | | 8/2000 | Teicher |
| 6,111,224 A | | 8/2000 | Witt |
| 6,140,611 A | | 10/2000 | Penard |
| 6,179,434 B1 | | 1/2001 | Saraiji |
| D444,314 S | | 7/2001 | Cox |
| 6,265,695 B1 | * | 7/2001 | Liebermann ................. 219/385 |
| 6,315,039 B1 | * | 11/2001 | Westbrooks, Jr. et al. .. 219/387 |
| 6,358,548 B1 | | 3/2002 | Ewald et al. |

FOREIGN PATENT DOCUMENTS

| | | | |
|---|---|---|---|
| DE | 3137961 | * | 4/1983 |
| FR | 2661732 | * | 11/1991 |

* cited by examiner

*Primary Examiner*—Joseph Pelham
(74) *Attorney, Agent, or Firm*—Lerner, David, Littenberg, Krumholz & Mentlik, LLP

(57) ABSTRACT

A combination food preparation and self-serve delivery system includes a housing and a food preparation compartment located in a rear section of the housing, the food preparation compartment including a first heating element for heating food placed in the food preparation compartment. The system also includes a self-serve compartment located in a front section of the housing for holding finished food product, the self-serve compartment including a second heating element for heating the finished food product placed therein. The first and second heating elements are separate and are adapted to operate independently of one another.

27 Claims, 8 Drawing Sheets

US 6,686,563 B1

COMBINATION FOOD PREPARATION AND SELF-SERVE DELIVERY SYSTEM

BACKGROUND OF THE INVENTION

The present application is generally related to the food service industry and is particularly related to food preparation and dispensing.

There have been many efforts directed to warming ovens for heating prepared foods. U.S. Pat. No. 6,111,224 to Witt discloses a food warming oven with transparent heating shelves. Referring to FIGS. 1 and 2 thereof, the food warming oven 10 includes a plurality of transparent heating shelves 12 for warming and holding food items 14 within serving pans 16. The food warming oven 10 includes a rectangular base 18, and a frame 20 that extends upwardly from base 18. Shelves 12 are removably connected to frame 20 and are positioned above base 18. The base 18, sidewalls 24, rear wall 28 and top section 30 define a food display area 52 for the food items 14. Hinges 56 pivotally attach a generally transparent lid 58 to a forward end 34 of base 18. The lid 58 substantially covers the food display area 52 without contacting the shelves 12 or the food items 14. The hinges 56 allow the transparent lid 58 to pivot about an axis positioned at the forward end 34 of base 18 for easy cleaning of the transparent lid 58 and display area 52.

U.S. Pat. No. 6,140,611 to Penard discloses a container for heating and reheating dishes. Referring to FIG. 4 thereof, the container includes a heat insulating box 13 having shelves 14 that carry plates 15. The plates 15 hold trays 16 for dishes containing food M that is reheated or kept hot in the container. The plates 15 are connected by conductive wires to a current source via switches that enable the whole plate or part thereof to be switched on. The container includes a perforated partition 17 defining a compartment including a cold-generating device 18 and fans 19.

U.S. Pat. No. 4,093,041 to Davis et al. discloses a food serving system for delivering prepared meals to locations remote from the point of preparation. Referring to FIG. 1 thereof, a cart 10 has a pair of fixed axle wheels 12 and a pair of pivotally supported wheels 14 to enable the cart to move freely in any direction. A pair of handles 16 are provided at the top of an end panel 18. The cart has three separate tray compartments 20, 22, and 24 each subdivided by a number of shelves 26 that support food trays in the compartments. Sliding doors 42 close each of the compartments 20, 22, and 24. The cart 10 includes a power pack and control circuit section 44 mounted between partitions 32 and 34. The power pack and control circuit section 44 is designed to supply the energy needed to energize the heat transfer devices on shelves 26.

U.S. Pat. No. 5,553,934 to Wells et al. discloses a hot countertop self-service food station. Referring to FIG. 1 thereof, the self-service food station 10 includes a countertop oven display assembly 12 and a cooled condiment server 14. The condiment server 14 includes a rear condiment envelope 16 with top loading openings 18 and lower gravity feed product removal openings 20. A front display wall is provided on the front side of the condiment envelope 16. Condiment server 14 has a forwardly projecting body with a stepped configuration including a middle tier receptacle area 24 and a lower tier receptacle area 26. Middle tier receptacle area 24 includes recessed areas for receiving rectangular metal bays 28 adapted to hold condiments 34. Lower tier area 26 includes a pair of bays 36 and 38 equipped with hand pump dispensers 40 for serving catsup and mustard. Napkins may be stored in a central receptacle area 42 in lower tier 26. Condiment server 14 includes a refrigeration element in the body portion thereof to keep the items chilled.

Wells' oven display assembly 12 includes a lower food-receiving oven portion 44 and an upper frame and marquis portion 46. Lower food-receiving oven portion 44 includes a glass-walled or windowed oven body 48 having a pair of parallel, spaced apart upstanding sidewalls 50 and 52 interconnected by a bottom wall 54 and opposed top wall 56. Oven body 48 has a double-door pass-through body design including a hinged front door panel 58 and a hinged rear door panel 60. Oven body 48 defines a generally rectangular heated compartment 64 adapted to receive a hot oven display rack 66 for displaying and storing a variety of pre-cooked, pre-heated foods in different sized packages, such as packages 68 and 70 shown in FIGS. 2 and 3 respectively. As shown in FIG. 1, in a fully stocked condition, display rack 66 holds hot food packages 68 and 70 in a matrix array defined by three columns 72 and three rows 74 so that nine individual packages are displayed through the front door panel 58. U.S. Pat. Nos. 5,203,255 and 5,464,279 to Wells et al. are related to the above described U.S. Pat. No. 5,553,934.

In spite of the above advances, there remains a need for a food delivery system that combines a food preparation compartment and a self-serve compartment into a single integrated unit. There also remains a need for a food delivery system that saves space atop countertops in retail establishments. There is also a need for a system that speeds up the process when a retail customer seeks to purchase a ready to eat finished food product.

SUMMARY OF THE INVENTION

In accordance with certain preferred embodiments of the present invention, a combination food preparation and self-serve delivery system includes a housing, a food preparation compartment located in a rear section of the housing, the food preparation compartment including a first heating element for heating food placed in the food preparation compartment, and a self-serve compartment located in a front section of the housing for holding finished food product. The self-serve compartment preferably includes a second heating element for heating the finished food product placed therein, the first and second heating elements being separate from one another and being adapted to operate independently of one another. As a result, the food placed in the food preparation compartment may be maintained at a temperature that is different than the temperature of the finished food product held in the self-serve compartment.

In certain preferred embodiments, the self-serve compartment is located directly in front of the food preparation compartment, and both the self-serve compartment and the food preparation compartment are integrated into a single housing. Integration into a single housing saves valuable retail countertop space and also creates a direct association between the finished food product in the self-serve compartment and the food being heated in the food preparation compartment.

In certain preferred embodiments, the combination also includes a rack located in said self-serve compartment for holding the finished food product spaced away from and over the second heating element. The rack preferably includes a plurality of rows tiered one above the other. Each row has a plurality of slots, each slot being adapted for holding at least one of the finished food products. The top of the self-serve compartment preferably slopes in a downward direction so that the self-serve compartment has a lower overall silhouette than the food preparation compartment. As a result, the finished food product stored in the self-serve compartment is highly visible, thereby capturing the attention of retail customers and enhancing sales. In many instances, retail customers do not wish to go through the process of making a finished food product such as a hot dog on a roll. Typically, this requires a customer to take a hot dog roll from a container, grab tongs for selecting a hot dog, open the oven or hot dog grill, place the hot dog in the roll, return the tongs to storage, close the hot dog grill, and place the hot dog roll and hot dog on a plate. The present invention does not require these burdensome tasks for the retail customer because the prepared hot dogs are wrapped and ready for pick-up from the racks. The tiered racks also enable the food products stored therein to maintain a high level of visibility to retail customers.

The combination food preparation and self-serve delivery system also preferably includes an a access door associated with said self-serve compartment. The access door is preferably transparent so that a retail customer may see through the access door into the self-serve compartment. The access door is preferably movable between a first position for closing the self-serve compartment and a second position for accessing the finished food product stored in the self-serve compartment. The access door serves a number of functions including maintaining the heat within the self-serve compartment and improving sanitary conditions. In certain preferred embodiments, the access door is hingedly connected to the housing for hingedly swinging between the first closed position and the second open position.

The combination food preparation and self-serve delivery system also preferably includes a first temperature controller for controlling operation of the first heating element and a second temperature controller, separate from the first temperature controller, for controlling operation of the second heating element. In preferred embodiments, the first and second temperature controllers are accessible at an exterior surface of the housing. In highly preferred embodiments, the first and second controllers are turnable knobs accessible at an exterior wall of the housing. The system also preferably includes an "on/off" switch for activating and deactivating the system including the first and second heating elements.

The combination food preparation and self-serve delivery system also preferably includes a drain in communication with the food preparation compartment. In certain preferred embodiments, the drain is in communication with a bottom surface of the food preparation compartment and includes a drain valve movable between a closed position and an open position. During rethermalization of food placed in the food preparation compartment, heated water or liquid may frequently be used. After use, the water or liquid must be drained from the food preparation compartment. This is preferably accomplished by connecting a drain hose to the drain, and then turning the drain valve to the open position for draining the liquid from the food preparation compartment. In certain preferred embodiments, the housing includes a drain access door movable between a closed position for covering the drain and an open position for obtaining access to the drain. In some embodiments, the drain access door is connected to the housing by hinges that enable the door to be swung between the closed and open positions.

The housing preferably includes a front wall, a rear wall spaced from the front wall and a top surface extending between upper ends of the front and rear walls. A rear region of the top surface over the food preparation compartment preferably extends in a first plane and a front region of the top surface over the self-serve compartment preferably extends in a second plane that intersects the first plane. The housing also preferably includes a bottom surface extending between the front and rear walls. A plurality of feet may project from the bottom surface. The feet are preferably designed for holding the housing above a surface, such as a retail countertop. The feet are desirably spaced from one another and may be evenly spaced from one another in the four corners of the housing. The housing also preferably includes opposing side walls extending between the front and rear walls. The side walls are preferably substantially parallel to one another, and the front and rear walls are preferably substantially parallel to one another. In certain preferred embodiments, the height of the front wall is less than the height of the rear wall so that the top surface of the housing over the self-serve compartment slopes downwardly to provide improved visibility of the finished food product stored in the self-serve compartment.

The combination food preparation and self-serve delivery system also preferably includes a menu unit secured to the housing. The menu unit includes at least one support arm secured to the housing and a menu mounting element secured to the at least one support arm. The menu unit may include one or more lights for selectively illuminating the information displayed on the menu mounting element.

The food preparation compartment is preferably adapted to hold one or more removable pan sets. In certain embodiments, a first section of the food preparation compartment may hold a soup pan set, while a second section of the food preparation compartment may hold a hot dog pan set. The combination of pan sets may be readily modified depending upon the type of food being heated therein. The types of food that may be heated in the food preparation compartment include hot dogs, hamburgers, sandwiches, soup, breakfast sandwiches, hot cereals, chicken, Italian food and Mexican food.

In certain embodiments, the exterior walls of the housing are adapted to have text and/or graphics secured thereto. The text and/or graphics may be advertising information or may alert retail customers as to the contents and prices of the food products contained in the combination system.

In other preferred embodiments of the present invention, a combination food preparation and self-serve delivery system includes a housing, and a food preparation compartment located in a rear section of the housing, the food preparation compartment including a first heating element for heating food placed in the food preparation compartment. The combination system also preferably includes a self-serve compartment located in a front section of the housing for holding finished food product. The self-serve compartment preferably includes a second heating element for heating the finished food product placed therein. As used herein, the term "finished food product" means a food that has been fully prepared for eating and that has been placed in a container or a wrapper for handling by a retail customer. The combination system also preferably includes a rack located in the self-serve compartment for holding the finished food product over the second heating element, a first temperature controller for controlling operation of the first heating element, and a second temperature controller for controlling operation of the second heating element, the first and second heating elements being adapted to operate independently of one another. The combination system also desirably includes a transparent access door associated with the self-serve compartment, the transparent access door being movable between a first position for closing the self-serve compartment and a second position for accessing the finished food product stored in the rack. In certain embodiments, the access door over the self-serve compartment includes a handle that may be grasped for moving the access door between the closed and open positions.

The housing may includes a bottom surface and a top surface, the top surface having a first region associated with the food preparation compartment that extends in a first plane substantially parallel with the bottom surface of the housing and a second region associated with the self-serve compartment that extends in a second plane that intersects the bottom surface of said housing. The housing may also include a front wall adjacent the self-serve compartment, a rear wall adjacent the food preparation compartment and a top surface extending between the front wall and the rear wall. The top surface preferably defines a first plane associated with the food preparation compartment that is substantially perpendicular to the rear wall, the top surface defining a second plane associated with the self-serve compartment that slopes toward the bottom surface between the first plane and the front wall.

In still other preferred embodiments of the present invention, a combination food preparation and self-serve delivery system includes a food preparation compartment including a first heating element for heating food placed in the food preparation compartment, and a self-serve compartment located in front of the food preparation compartment adapted to hold finished food product. The self-serve compartment also preferably includes a second heating element for heating the finished food product placed therein, the self-serve compartment having a downwardly sloping top surface so that the self-serve compartment has a lower overall silhouette than the food preparation compartment. The combination system also preferably includes a unitary housing surrounding the food preparation system and the self-serve compartment to form an integrated unit. The system also desirably includes a tiered rack located in the self-serve compartment for holding a plurality of the finished food product, the tiered rack being adapted to hold said finished food product spaced from the second heating element.

These and other preferred embodiments of the present invention will be described in more detail below.

DETAILED DESCRIPTION

Figure 1:
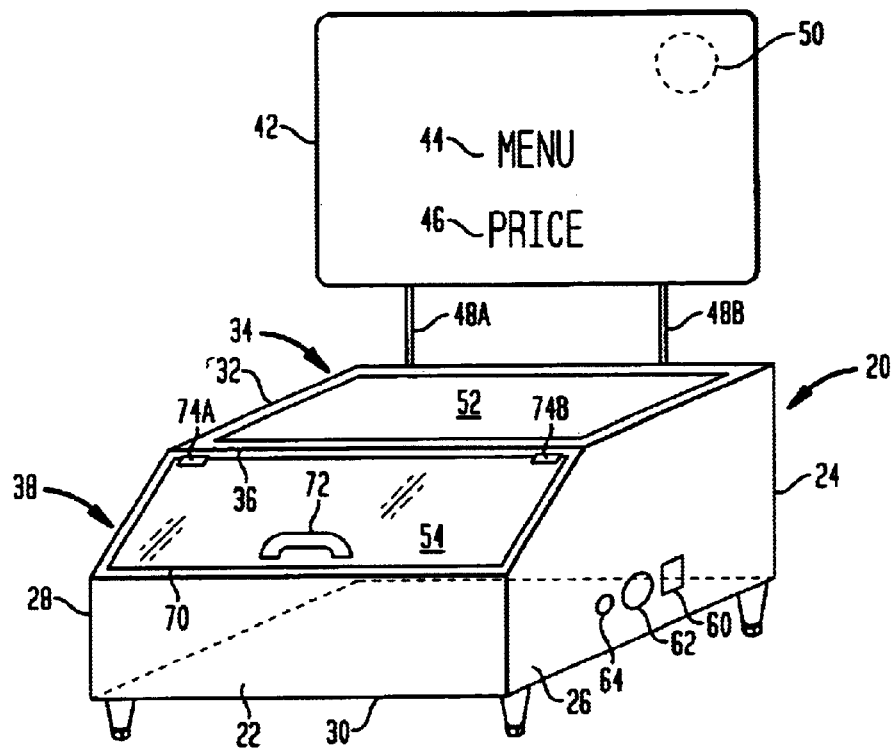
FIG. 1 shows a perspective view of a combination food preparation and self-serve delivery system including a housing, in accordance with certain embodiments of the present invention.
Figure 2:
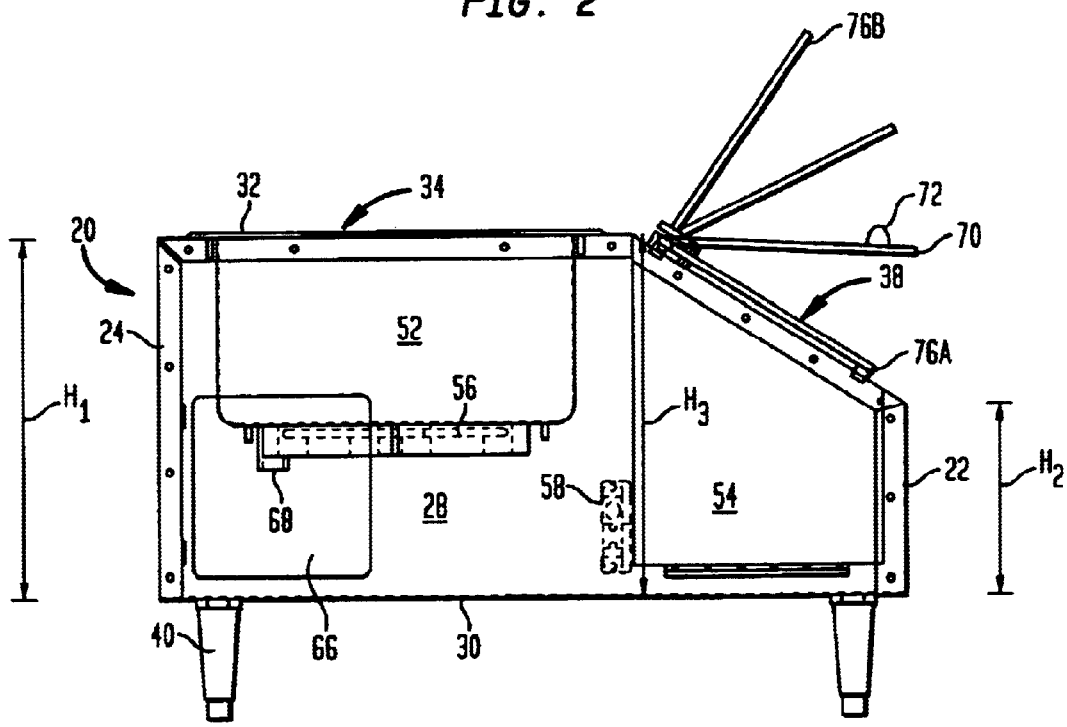
FIG. 2 shows a left side elevational view of the housing shown in FIG. 1.

FIGS. 1–2 show a combination food preparation and self-serve delivery system including a housing 20 having a front wall 22, a rear wall 24 spaced from front wall 22, a right side wall 26 and a left side wall 28 spaced from the right side wall. The left and right side walls 26, 28 extend between front wall 22 and rear wall 24. Housing 20 also includes a bottom surface 30 extending between front and rear walls 22, 24 and left and right walls 26, 28. Housing 20 also includes a top surface 32 having a rear region 34 that extends between rear wall 24 and intermediate section 36, and a forward region 38 that extends between front wall 22 and intermediate section 36. Rear wall 24 has a height $H_1$ that is greater than the height $H_2$ of front wall 22. Intermediate section 36 of housing 20 defines a height $H_3$ between top surface 32 and bottom surface 30 that is substantially equal to height $H_1$ of rear wall 24. As a result, the top surface 32 of rear region 34 extends in a plane that is substantially parallel to the bottom surface 30, while the top surface 32 of front region 38 slopes downwardly between intermediate section 36 and front wall 22. Housing 20 also includes feet 40 projecting from bottom surface 30. Feet 40 are preferably connected to bottom surface 30 and may be evenly spaced from one another at the four corners of housing 20.

Referring to FIG. 1 in certain preferred embodiments, a menu board 42 listing menu items 44 and prices 46 may be secured to housing 20 by support arms 48a, 48b. A light 50 may be provided for illuminating the menu board and the information provided thereon.

Figure 3:
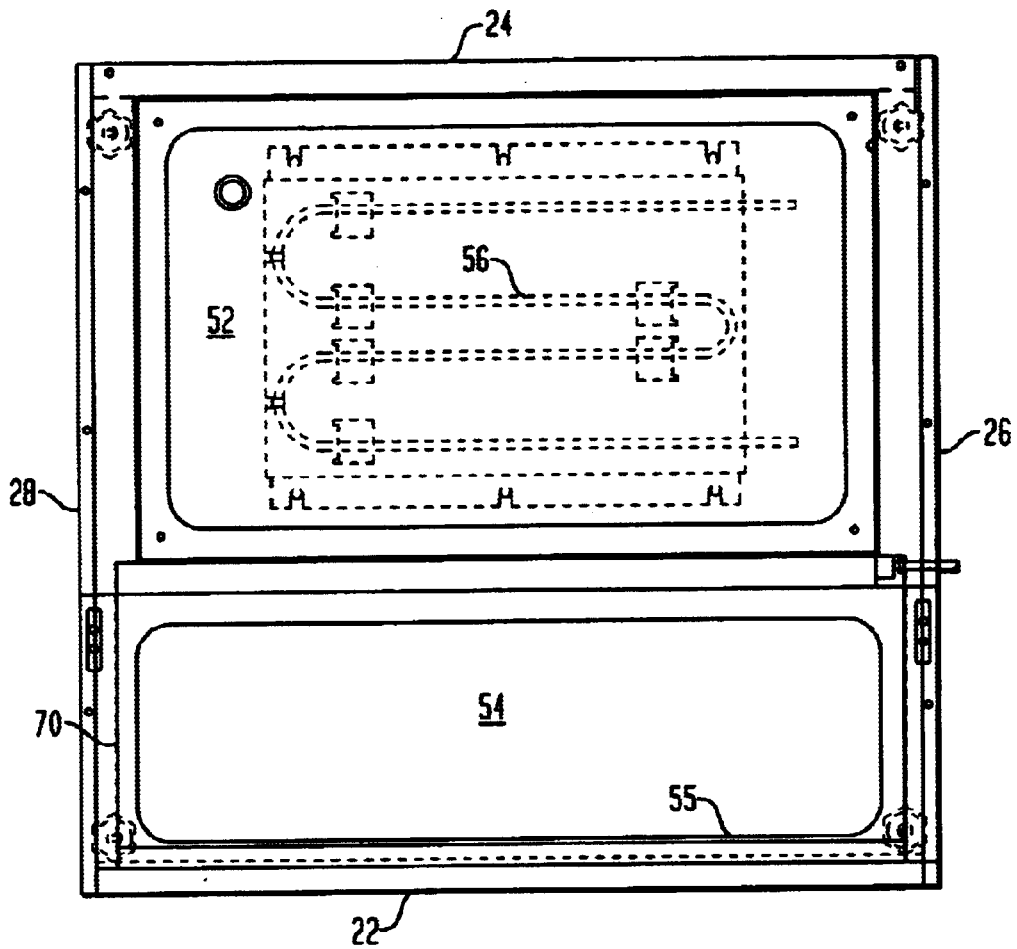
FIG. 3 shows a top plan view of the housing shown in FIG. 1.
Figure 4:
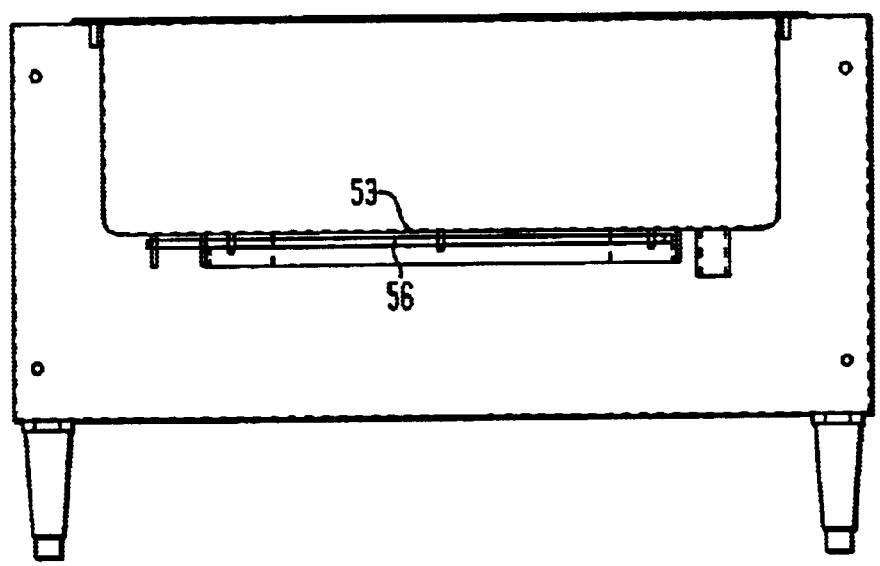
FIG. 4 shows a rear view of the housing shown in FIG. 1.

Referring to FIGS. 1–4, the combination food preparation and self-serve delivery system includes a food preparation compartment 52 located in a rear section of housing 20 and a self-serve compartment 54 located in a front section of housing 20 adapted to hold finished food product. Referring to FIGS. 2–4, the food preparation compartment 52 includes a first heating element 56 for heating food placed in the food preparation compartment 52. Referring to FIG. 2, the self serve compartment 54 includes a second heating element 58 for heating the finished food product placed therein. The first and second heating elements 56, 58 are separate from one another and are adapted to operate independently of one another. Referring to FIG. 1, the system includes an "on/off" button 60, a first temperature control 62 for controlling first heating element 56 and a second temperature controller 64 for controlling second heating element 58.

Referring to FIG. 2, left side wall 28 includes a drain access door 66 that is normally closed and flush with the surface of left side wall 28. Drain access door 66 may be moved to an open position for providing access to a drain 68 in communication with food preparation compartment 52. A hose (not shown) may be connected to a lower end of drain 68 for draining liquid or fluid from food preparation compartment 52, preferably during clean-up of the system.

Referring to FIGS. 1–3, the combination food preparation and self-serve delivery system also desirably includes a self-serve compartment access door 70 having a handle 72. Self-serve compartment access door 70 is preferably connected to housing 20 by hinges 74a, 74b for moving between a first closed position 76a for covering an opening to self-serve compartment 54 and a second open position 76b for providing access to self-serve compartment 54. Referring to FIG. 3, access door 70 is preferably sized and shaped to completely cover opening 55 of the self-serve compartment for maintaining sanitary conditions and appropriate temperature levels in the self-serve compartment.

The combination food preparation and self-serve delivery system is an integral unit completely enclosed within the front and rear walls 22, 24 and left and right side walls 26, 28 of housing 20. The self-serve compartment 54 is preferably located in front of food preparation compartment 52. The first heating element 56 is preferably located directly below a bottom surface 53 of food preparation compartment 52.

Figure 5:
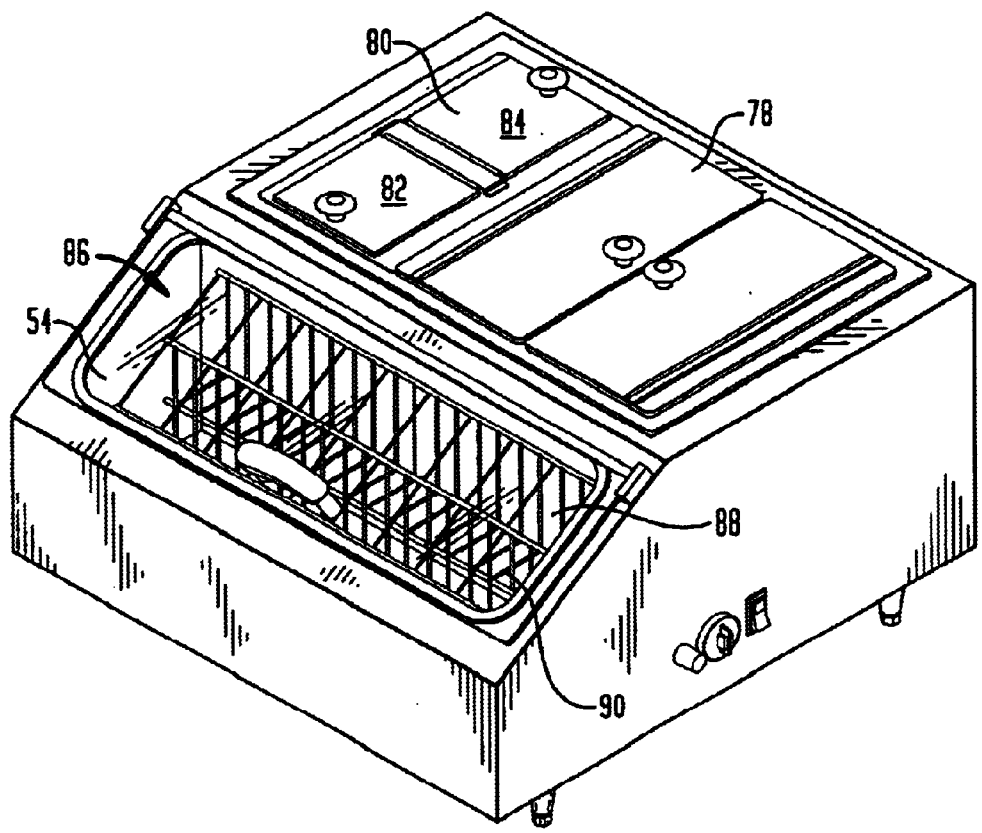
FIG. 5 shows the housing of FIG. 1 including pan insets disposed in a food preparation compartment and a storage rack in a self-serve compartment, in accordance with certain preferred embodiments of the present invention.
Figure 9:
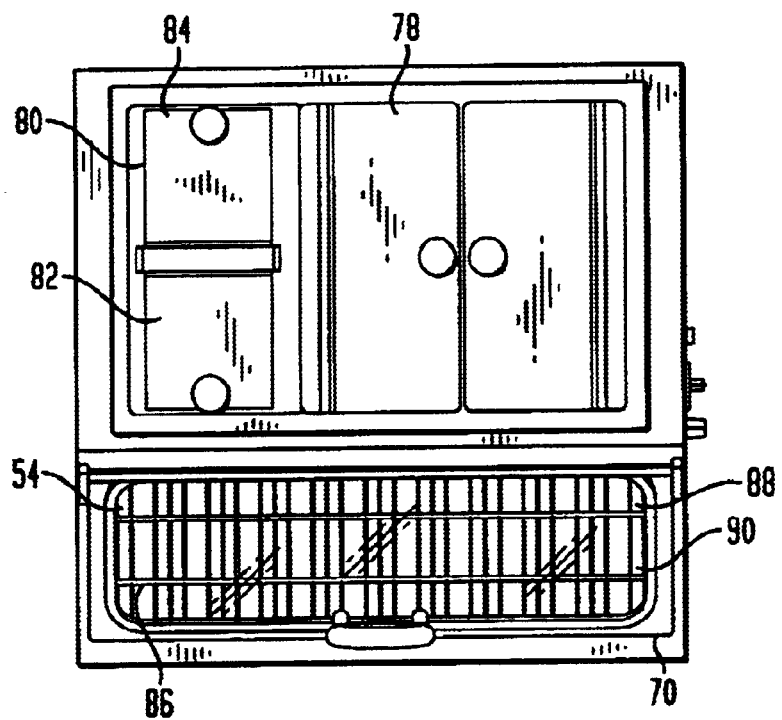
FIG. 9 shows a top plan view of the housing shown in FIG. 5.

Referring to FIGS. 5 and 9, in certain preferred embodiments of the present invention, a plurality of pan sets are inserted into the food preparation compartment. The pan sets include a first pan set 78 for heating food placed therein such as hot dogs, and a second pan set 80 adjacent first pan set 78. The second pan set 80 may include a front door 82 and a rear door 84 for covering heated condiments such as sauerkraut and onions. A tiered rack 86 is disposed within self-serve compartment 54. The tiered rack 86 includes a rear row 88 and a front row 90 located directly in front of rear row 88. The rack may include three or more rows in other preferred embodiments. In high preferred embodiments, the tiered rack has a front row, an intermediate row and a rear row. As will be described in more detail below, the tiered rack is adapted to hold finished food product that may be easily seen and accessed by an individual seeking self-service food in a retail establishment.

Figure 6:
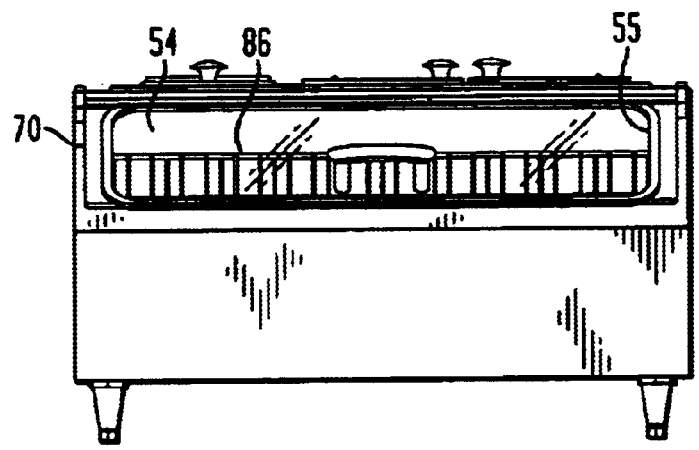
FIG. 6 shows a front elevational view of the housing shown in FIG. 5.
Figure 8:
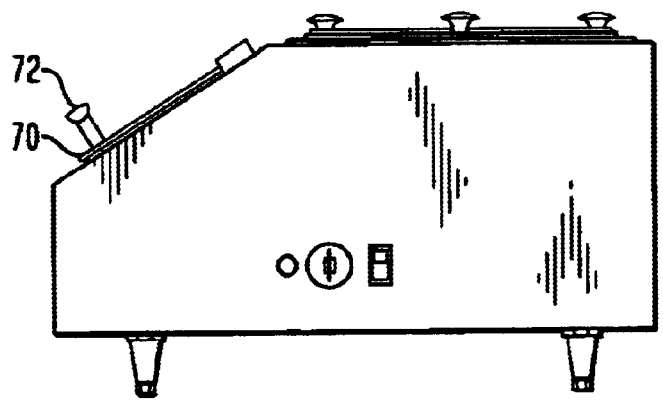
FIG. 8 shows a right side elevational view of the housing shown in FIG. 5.

FIGS. 6 and 8 show the combination food preparation and self-serve delivery system including self-serve compartment access cover 70 covering the opening 55 of self-serve compartment 54. Rack 86 is disposed within self-serve compartment 54 for holding finished food product so that the food product is visible through the cover 70.

Figure 7:
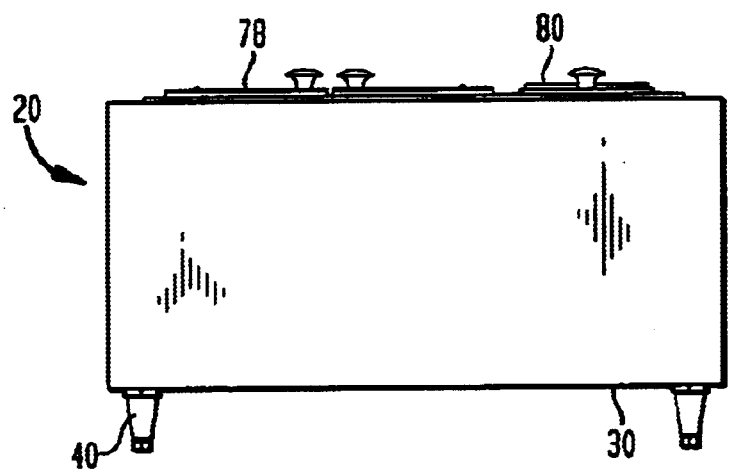
FIG. 7 shows a rear elevational view of the housing shown in FIG. 5.

FIG. 7 shows a rear elevational view of housing 20 with first pan set 78 and second pan set 80 disposed in food preparation compartment (not shown). Feet 40 attached to bottom surface 30 of housing 20 hold housing 20 at a spaced distance above a surface (not shown).

Figure 10:
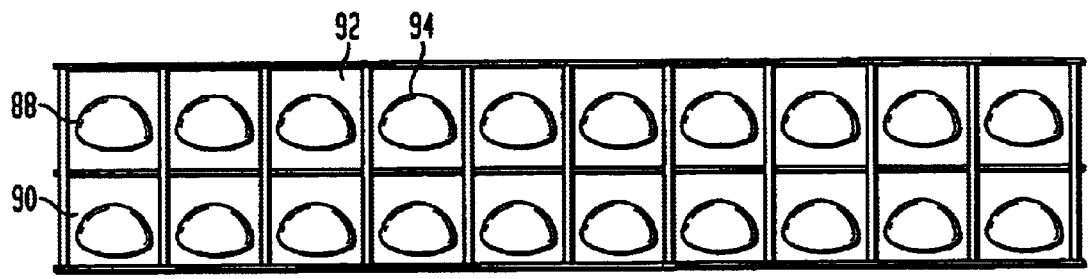
FIG. 10 shows a top plan view of the rack shown in FIG. 5.
Figure 11:
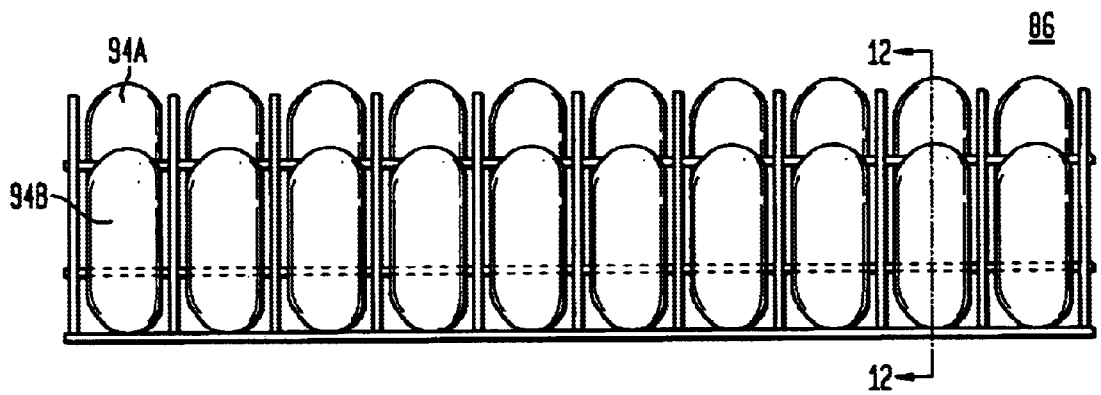
FIG. 11 shows a front elevational view of the rack shown in FIG. 5.
Figure 12:
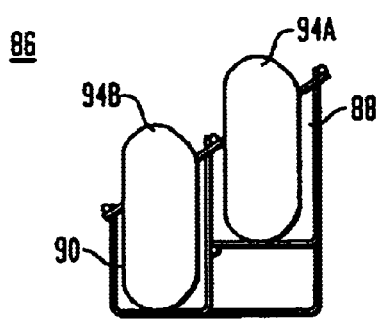
FIG. 12 shows a cross-sectional view of the rack shown in FIG. 11 taken along line 12—12 thereof.

FIGS. 10–12 show tiered rack 86 including rear row 88 and front row 90. In a particular preferred embodiment shown in FIGS. 10–12, tiered rack 86 has ten slots 92 in rear row 88 and ten slots in front row 90. Other preferred racks may have three or more rows and less than or more than ten slots in each row. Finished food product 94, such as sandwiches, hot dogs or breakfast sandwiches, are stored within the individual slots 92 of the respective row 88, 90. Referring to FIGS. 11 and 12, the tiered configuration of the rack 86 enables the finished food product 94a in rear row 88 to be elevated above the finished food product 94b in front row 90, thereby providing improved visibility of the finished food product stored in self-serve compartment.

Figure 13:
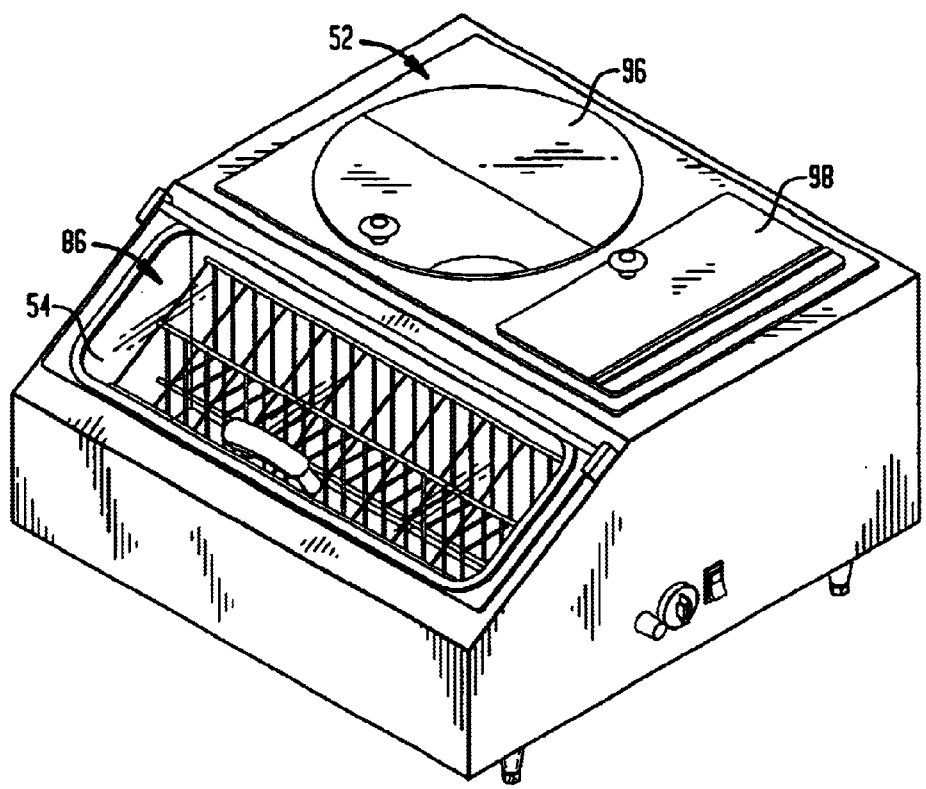
FIG. 13 shows a perspective view of a combination food preparation and self-serve delivery system, in accordance with yet another preferred embodiment of the present invention.
Figure 14:
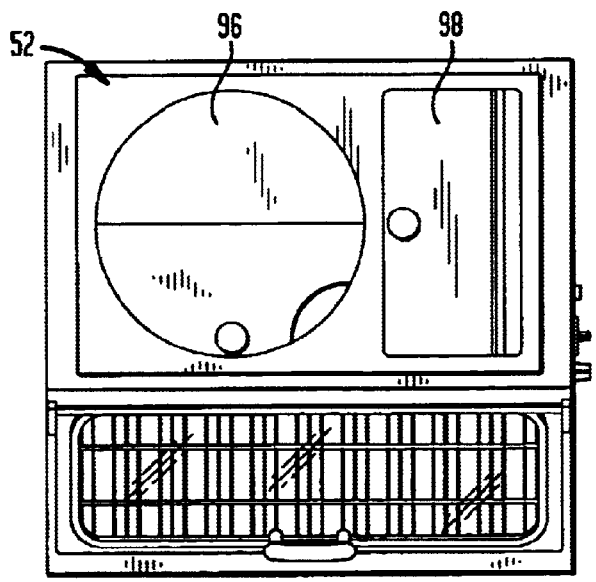
FIG. 14 shows a top plan view of the system of FIG. 13.

Referring to FIGS. 13 and 14, in certain preferred embodiments, the type and configuration of the pan sets may be modified for heating different types of food. In the particular preferred embodiment shown in FIGS. 13 and 14, a soup pan set 96 is secured in a left side of food preparation compartment 52 and a hot dog pan set 98 similar to pan set 78 of FIG. 5, is secured in a right side of food preparation compartment 52. The combination of pan sets may be continuously modified depending upon the type of food being heated in the food preparation compartment 52. As a result, various foods such as soup, Mexican and Italian food, chicken, cereal, hamburgers, hot dogs, sandwiches and breakfast sandwiches may be thermalized in food preparation compartment 52. The rack 86 in self-serve compartment may be modified to accept finished food product of different sizes. For example, the rack 86 may be redesigned to hold thermalized cups for hot soup or chili.

Figure 15:
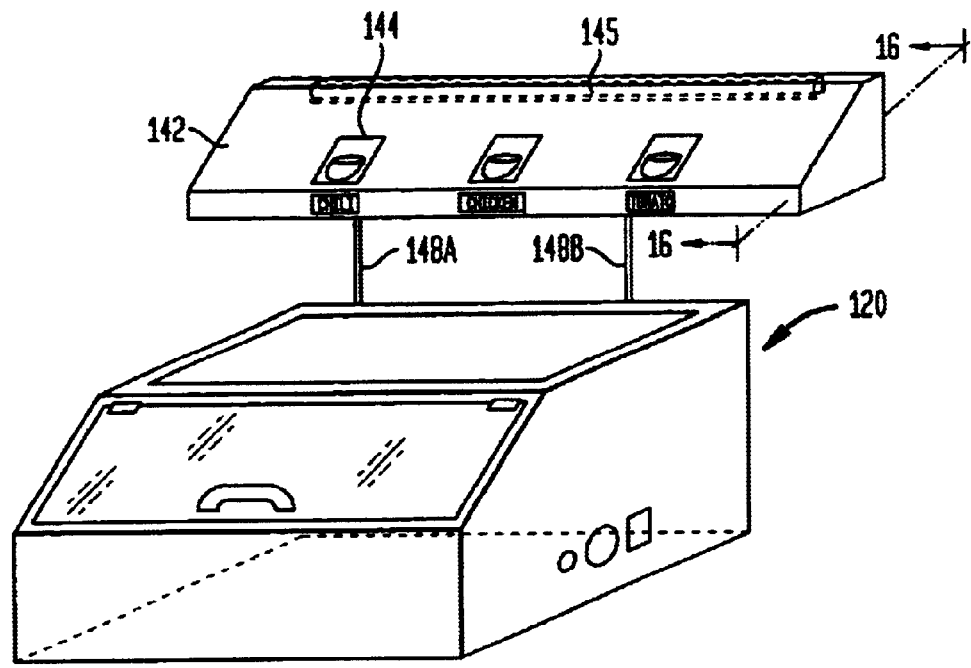
FIG. 15 shows a perspective view of a combination food preparation and self-serve delivery system, including a menu-displaying canopy, in accordance with still another preferred embodiment of the present invention.
Figure 16:
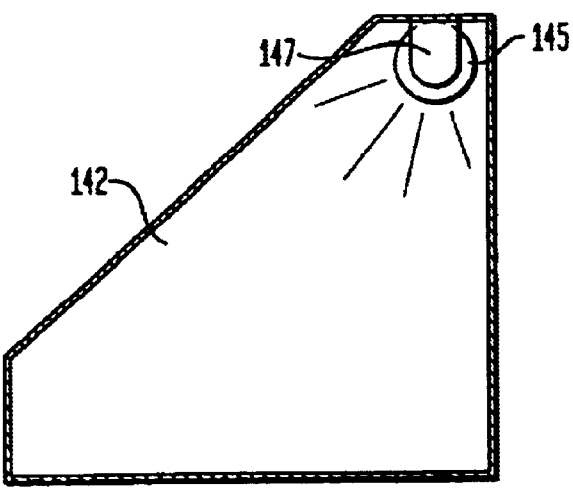
FIG. 16 shows a cross-sectional view of the canopy of FIG. 15 taken along line 16—16 thereof.

FIGS. 15 and 16 show a combination food preparation and self-serve delivery system in accordance with yet another embodiment of the present invention. Referring to FIG. 15, a canopy 142 including a light 145 for illuminating the menu information 144 is secured to housing 120 by support arms 148a, 148b. The menu information 144 may include at least partially transparent sheets that enable the light generated by light 145 to pass therethrough and be visible to retail customers at a front side of housing 120. Referring to FIG. 16, in one preferred embodiment, light 145 is a fluorescent light secured at opposite ends to plug 147, which provides electrical power to light 145.

The combination food preparation and self-serve delivery system is designed to be a multi-functional re-thermalizing and serving system combined into one integral housing to provide a space efficient footprint. Combining a food preparation compartment and a self-serve compartment in a single housing saves valuable space in a retail establishment. In operation, food is precooked to appropriate levels. The precooked food is then placed in the pan insets disposed in the food preparation compartment. The "on" switch on an exterior surface of the housing is activated and a appropriate temperature for the first heating element in communication with the food preparation compartment is selected. Depending upon the type of precooked food placed in the food preparation compartment, different pan sets may be used. For example, a soup or liquid-holding pan set will be used for food products such as chili, beans and soup. On the other hand, a sandwich pan inset will be used for other types of food products such as hot dogs, sausages, egg rolls, etc. The temperature controller for the first heating element is preferably a knob that may be rotated for increasing or decreasing the level of heat in the food preparation compartment.

The front self-serve compartment is heated independently by the second heating element. The exact temperature generated by the second heating element is controlled by a second temperature controller accessible at an exterior surface of the housing. The self-serve compartment includes the rack which holds the finished (wrapped) product, such as hot dogs, burritos, egg rolls, tacos, etc., at industry recommended safe temperatures for retail customers to "grab and go." In preferred embodiments, the tiered rack is capable of holding different types of finished food product. The tiered rack preferably holds the finished product away from direct contact with a bottom of the self-serve compartment. The system also includes a front access door which normally closes the self-serve compartment. In preferred embodiments, the front access door is substantially transparent and may be made of material such a polycarbonate plastic. During clean-up of the transparent access door, a soft sponge and soapy water should be used for cleaning. An abrasive cleaner or ammoniated cleaners should not be used.

The combination food preparation and self-serve delivery system also includes a mountable menu. The mountable menu may include a light for illuminating the menu items and prices listed thereon.

Although the present invention is riot limited by any particular theory of operation, it is believed that the configuration of the self-serve compartment directly in front of the food preparation compartment enhances the visibility of finished food product and will increase sales in a retail establishment. Typically, a retail clerk will reheat the food in the food preparation compartment. For example, hot dogs may be heated using hot water in the food preparation compartment. The retail clerk will prepare the hot dog rolls by heating the hot dog rolls in the self-serve compartment. When the hot dogs and hot dog rolls are heated to appropriate temperatures, the clerk will place the heated hot dogs in the rolls, and then place the completed hot dog and roll in a container, such as a wrapper. The wrapped food product will then be placed in the racks in the self-serve compartment. The second heater in communication with the self-serve compartment will maintain the finished and wrapped hot dogs at an appropriate temperature. Retail customers may then easily open the substantially transparent access door of the self-serve compartment to grab one or more of the hot dogs stored in the racks. The existence of the finished wrapped hot dogs in the racks has been found to encourage retail customers to consume more of the products being sold by the retail establishment. Such a system overcomes the natural reluctance of retail customers to prepare their own finished food products, which typically requires the retail customer to touch knobs, handles and tongs that may be unsanitary. The present invention avoids those problems by preparing prepacked food in sanitary "grab and go" containers. The present invention also works well for pre-prepared tacos that may be wrapped and placed in the racks, as well as soup that may be placed in containers and then heated in the racks in the self-serve compartment. The ease with which the retail customer may not only choose but also purchase whatever finished food product he desires makes this invention particularly desirable.

In order to clean the combination system, the "on/off" switch is moved to the "off" position to turn the unit off. The water present in the food preparation compartment should be allowed to cool to a safe temperature. The side access door in the left side wall of the housing should then be opened to expose the drain in communication with the bottom of the food preparation compartment. A hose is preferably attached to the drain. The drain valve is then moved to an open position to remove the water from the food preparation compartment. After the water is drained, the drain valve is turned back to the closed position and the drainage hose is disconnected from the drain. The access door may then be closed.

Although the present invention is not limited by any particular theory of operation, it is believed that providing a self-serve compartment for finished food product directly in front of a food preparation compartment, whereby the self-serve compartment and the food preparation compartment are integrally connected together in a single housing, provides valuable space on a retail countertop. The integral design with the self-serve compartment directly in front of the food preparation compartment has also been found to increase retail sales due to the fact that a consumer may easily "grab and go" with a finished food product, rather than being required to make the finished food product. Moreover, the association of the finished food product in the self-serve compartment with the food being heated in the food preparation compartment and being promoted on the menu board further enhances the level of retail sales. In addition, the tiered rack and sloping top surface of the self-serve compartment improves the visibility of the finished food product, which has also been found to enhance retail sales.

What is claimed is:

1. A combination food preparation and self-serve delivery system comprising:
    a housing;
    a food preparation compartment located in a rear section of said housing, said food preparation compartment including a first heating element for heating food placed in said food preparation compartment; and
    a self-serve compartment located in a front section of said housing for holding finished food product, said self-serve compartment including a second heating element for heating said finished food product placed therein, wherein said first and second heating elements are separate and are adapted to operate independently of one another.

2. The system as claimed in claim 1, further comprising a rack located in said self-serve compartment for holding said finished food product over said second heating element.

3. The system as claimed in claim 1, wherein said rack includes at least two rows, and wherein each row has a plurality of slots, each slot being adapted for holding at least one of said finished food product.

4. The system as claimed in claim 3, wherein the rows of said rack are tiered one above another.

5. The system as claimed in claim 1, further comprising a transparent access door associated with said self-serve compartment, said transparent access door being movable between a first position for closing said self-serve compartment and a second position for accessing the finished food product stored in said rack.

6. The system as claimed in claim 5, wherein said transparent access door is hingedly connected to said housing.

7. The system as claimed in claim 1, further comprising:
    a first temperature controller for controlling operation of said first heating element;
    a second temperature controller separate from said first temperature controller for controlling operation of said second heating element.

8. The system as claimed in claim 1, further comprising a drain in communication with said food preparation compartment, said drain including a drain valve movable between a closed position and an open position.

9. The system as claimed in claim 8, wherein said housing includes an drain access door movable between a closed position for covering said drain and an open position for obtaining access to said drain.

10. The system as claimed in claim 1, wherein said housing includes a front wall, a rear wall spaced from said front wall and a top surface extending between upper ends of said front and rear walls, a rear region of said top surface over said food preparation compartment extending in a first plane and a front region of said top surface over said self-serve compartment extending in a second plane that intersects said first plane.

11. The system as claimed in claim 1, wherein said housing includes a bottom surface extending between said front and rear walls.

12. The system as claimed in claim 11, further comprising a plurality of feet projecting from said bottom surface, said feet being spaced from one another.

13. The system as claimed in claim 10, further comprising opposing side walls extending between said front and rear walls, said side walls being substantially parallel to one another and said front and rear walls being substantially parallel to one another.

14. The system as claimed in claim 1, further comprising a menu unit secured to said housing, said menu unit including at least one support arm secured to said housing and a menu mounting element secured to said at least one support arm.

15. The system as claimed in claim 14, wherein said menu unit further comprises at least one light for selectively illuminating said menu mounting element.

16. The system as claimed in claim 1, wherein said food preparation compartment is adapted to hold one or more removable pan sets.

17. The system as claimed in claim 16, wherein said one or more removable pan sets are adapted for holding the food.

18. The system as claimed in claim 1, wherein the food is selected from the group consisting of hot dogs, hamburgers, sandwiches, soup, breakfast sandwiches, cereal, chicken, Italian food and Mexican food.

19. The system as claimed in claim 1, further comprising text and graphics secured to an outer surface of said housing.

20. The system as claimed in claim 1, further comprising a handle secured to said transparent access door for moving said access door between the closed and open positions.

21. A combination food preparation and self-serve delivery system comprising:
   a housing;
   a food preparation compartment located in a rear section of said housing, said food preparation compartment including a first heating element for heating food placed in said food preparation compartment;
   a self-serve compartment located in a front section of said housing for holding finished food product, said self-serve compartment including a second heating element for heating said finished food product placed therein;
   a rack located in said self-serve compartment for holding the finished food product over said second heating element;
   a first temperature controller for controlling operation of said first heating element;
   a second temperature controller for controlling operation of said second heating element, wherein said first and second heating elements are adapted to operate independently of one another;
   a transparent access door associated with said self-serve compartment, said transparent access door being movable between a first position for closing said self-serve compartment and a second position for accessing the finished food product stored in said rack.

22. The system as claimed in claim 21, further comprising a menu unit secured to said housing for displaying information related to the food placed in said food preparation compartment and the finished food product held in said rack.

23. The system as claimed in claim 21, wherein said housing includes a bottom surface and a top surface, said top surface having a first region associated with said food preparation compartment that extends in a first plane that is substantially parallel with said bottom surface of said housing and a second region associated with said self-serve compartment that extends in a second plane that intersects said bottom surface of said housing.

24. The system as claimed in claim 23, wherein said housing includes a front wall adjacent said self-serve compartment, a rear wall adjacent said food preparation compartment and a top surface extending between said front wall and said rear wall, said top surface defining a first plane associated with said food preparation compartment that is substantially perpendicular to said rear wall, said top surface defining a second plane associated with said self-serve compartment that slopes toward said bottom surface between said first plane and said front wall.

25. A combination food preparation and self-serve delivery system comprising:
   a food preparation compartment including a first heating element for heating food placed in said food preparation compartment;
   a self-serve compartment located in front of said food preparation compartment adapted to hold finished food product, said self-serve compartment including a second heating element for heating said finished food product placed therein, said self-serve compartment having a downwardly sloping top surface so that said self-serve compartment has a lower overall silhouette than said food preparation compartment;
   a unitary housing surrounding said food preparation system and said self-serve compartment to form an integrated unit;
   a tiered rack located in said self-serve compartment for holding a plurality of said finished food product, said tiered rack being adapted to hold said finished food product spaced from said second heating element.

26. The system as claimed in claim 25, further comprising:
   a first temperature controller for controlling operation of said first heating element;
   a second temperature controller for controlling operation of said second heating element, wherein said first and second heating elements are adapted to operate independently of one another.

27. The system as claimed in claim 25, further comprising:
   a transparent access door associated with said self-serve compartment, said transparent access door being movable between a first position for closing said self-serve compartment and a second position for accessing the finished food product stored in said rack, wherein said finished food product in said rack is visible through said transparent access door.

* * * * *